No. 716,429. Patented Dec. 23, 1902.
J. F. KELLY.
COMPENSATING SYSTEM.
(Application filed Aug. 1, 1901.)
(No Model.) 2 Sheets—Sheet 1.
Fig. 1.
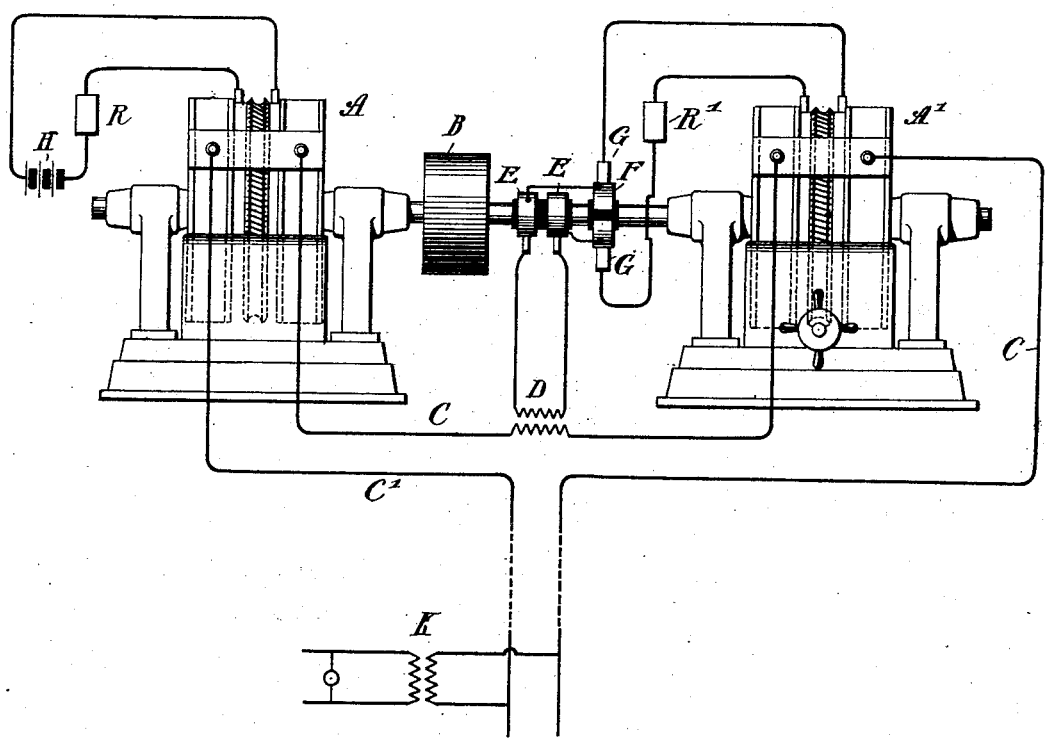
Fig. 1.ª
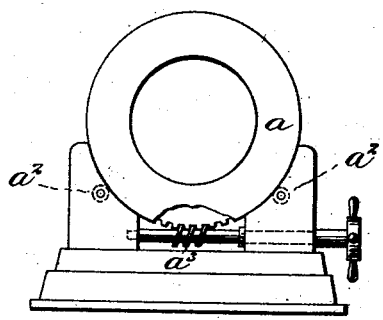
Fig. 4.
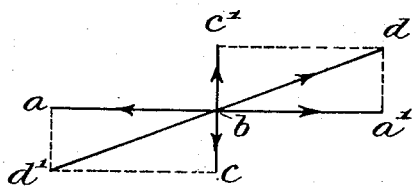
WITNESSES:
INVENTOR:
John F. Kelly
BY
ATTORNEY

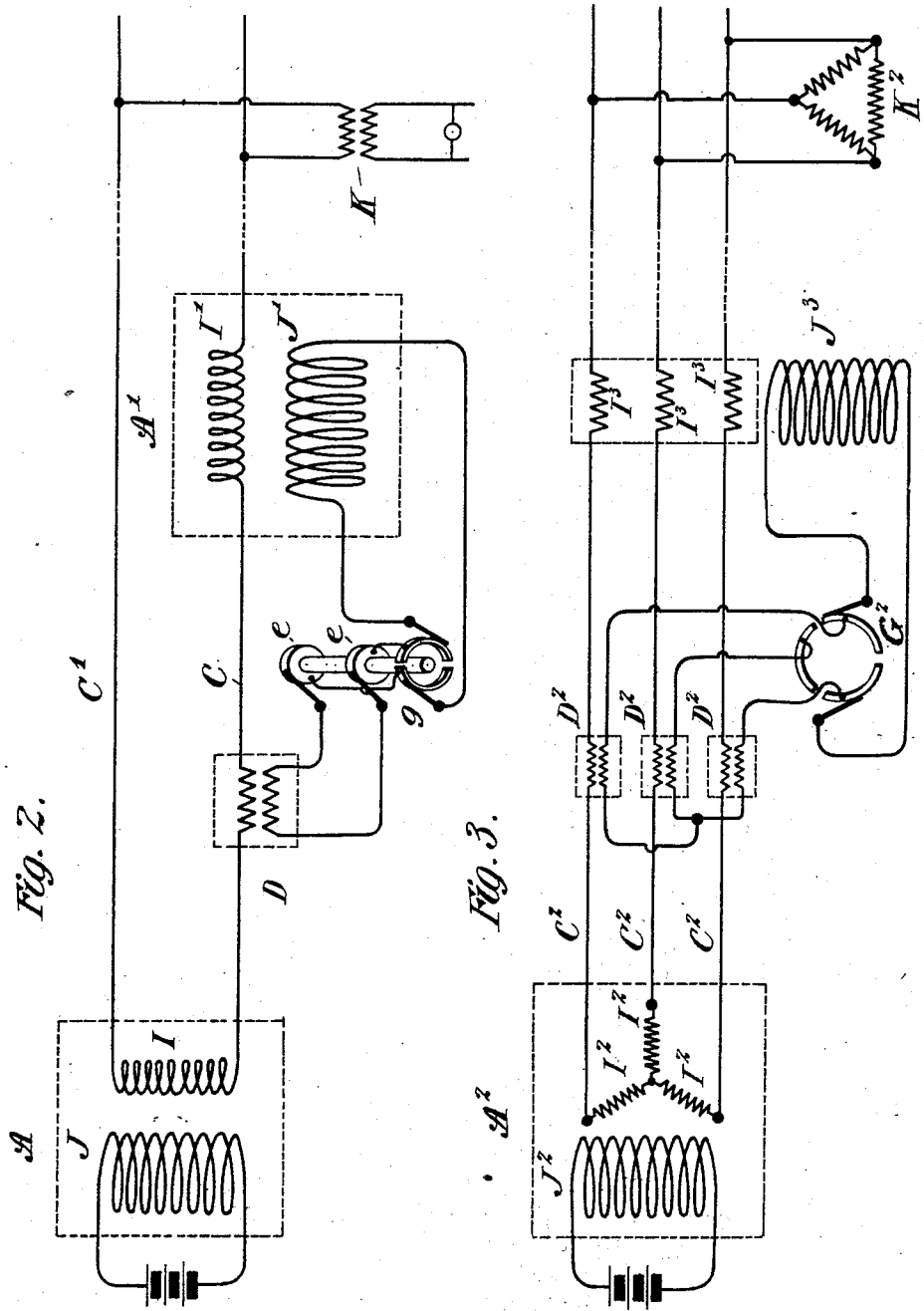

UNITED STATES PATENT OFFICE.

JOHN F. KELLY, OF PITTSFIELD, MASSACHUSETTS.

COMPENSATING SYSTEM.

SPECIFICATION forming part of Letters Patent No. 716,429, dated December 23, 1902.

Application filed August 1, 1901. Serial No. 70,462. (No model.)

*To all whom it may concern:*

Be it known that I, JOHN F. KELLY, a citizen of the United States, residing at Pittsfield, Berkshire county, Massachusetts, have invented certain new and useful Improvements in Compensating Systems, of which the following is a full, clear, and exact description.

My invention relates to means for compensating for self-induction in systems of distribution by alternating currents and also for the resistance-drop in such systems, and has for its object to provide a simple, effective, and comparatively inexpensive means for accomplishing either or both of these results.

In systems of distribution by alternating currents the self-induction of the main conductors or leads, particularly in long-distance transmission, interferes greatly with the transmission of power, so much so, in fact, that it is one of the chief difficulties encountered in long-distance transmission. The reason is that the self-induction causes the current to lag behind the electromotive force impressed on the circuit at the generating-station, and, as is well known, the greater the self-induction the greater is the lag, and the nearer the lag approaches ninety degrees the less is the energy transmitted by any given current. The lag in the current is caused by an electromotive force set up by the self-induction of the system, or rather by the electromotive force due to this self-induction, and one object of my invention is to provide means for neutralizing this electromotive force of self-induction, and thereby rid the system of this deleterious effect. I do this by placing in the transmission-line of each of one or more circuits in series with the main generator an auxiliary generator which shall impress upon the transmission-line of its circuit an electromotive force varying with the electromotive force of self-induction and having a component or being itself equal and opposite to said electromotive force. This auxiliary electromotive force can be adjusted so as to neutralize the electromotive force of self-induction of the main conductors or leads. Moreover, the auxiliary generator can be adjusted so as to also compensate for the drop in potential due to an increase in load, which is a further object of my invention.

The following is a description of an apparatus and system embodying my invention, reference being had to the accompanying drawings, in which—

Figure 1 illustrates an apparatus at the generating-station of a system embodying my invention. Fig. 1$^a$ is a detail view of the auxiliary generator. Fig. 2 represents an arrangement of circuits in a single-phase system embodying my invention. Fig. 3 represents an arrangement embodying my invention suitable for a three-phase system of transmission. Fig. 4 is a diagram of forces.

Referring more particularly to the drawings, A A' represent, respectively, a main generator and an auxiliary generator of the inductor type operated from the same shaft by power applied to the pulley B.

C is a conductor leading from the armature of the main generator A to the point to which power is to be transmitted and being in series with the armature of the auxiliary generator A', while C' is the second conductor leading from the opposite terminal of the generator A to the point to which power is to be transmitted, the two constituting the line or leads for a work-circuit of the system. In the conductor C is a series transformer D, whose secondary is connected by means of contact-rings E E to a rectifying-commutator F, from which a current is taken by means of brushes G G to the terminals of the energizing-coil of the auxiliary generator A'. The main generator is energized from a separate source H. The auxiliary generator is constructed so as to permit the space relations between its armature and field-magnet poles to be adjusted. This is shown in Fig. 1$^a$, in which $a$ represents the stationary part of an inductor-dynamo carrying the armature-coils and supported by friction-rolls $a^2$ on its base, so that it can be moved by the worm $a^3$, mounted in said base and engaging therewith.

R R' represent rheostats in the field-circuits of the main and auxiliary generators, respectively, for regulating their field-magnet strength.

When the generators A A' are mounted upon the same shaft, they are of course constructed so as to give the same number of alternations for one revolution, since it is necessary that the electromotive forces of the two machines shall be in synchronism.

In adjusting the apparatus so as to compensate only for the self-induction of the line the auxiliary generator is adjusted so that its electromotive force leads on the applied electromotive force by ninety degrees, the reason being that the electromotive force of self-induction of the line is at right angles to the applied electromotive force flowing and behind the applied electromotive force. The strength of the field-magnet on the auxiliary generator A' is so adjusted that the electromotive force of that generator shall be equal to the electromotive force of self-induction of the line at some one value of current. When this adjustment is made, the electromotive force of the auxiliary generator will be equal to the electromotive force of self-induction of the line at all values of current with the same power factor, for the reason that the self-induction of the system is proportional to the current flowing, since its field-magnet is energized from the series transformer D through the rectifying-commutator F, so that its field-magnet strength is in proportion to the current in the leads. The circuit arrangements of this apparatus are shown in Fig. 2, in which A is the main generator, having the armature-coil I and the field-coil J, and A' is the auxiliary generator, having the field-coil J' and the armature-coil I' in series with the conductor C. D is the transformer supplying current through the commutator $g$ to the auxiliary-generator field-coil J', and K is the load at the point to which the energy is transmitted.

In Fig. 3 a three-phase system is illustrated, $A^2$ being the main generator, with its armature-winding $I^2$ and field-coil $J^2$. $C^2 C^2 C^2$ are three mains leading from the generator, to each of which is an armature-coil $I^3$ of a three-phase auxiliary generator $A^4$, having a field-coil $J^3$. $D^2 D^2 D^2$ are three transformers having their primary coils in series with the main and auxiliary generator coils and their respective conductors and having their secondaries connected star-fashion to the three segments of the rectifying-commutator $G^2$, from which current is led to the field-coil $J^3$. $K^2$ represents a three-phase motor or other translating device at the point to which the power is to be transmitted. It will be seen that this arrangement operates in the same manner as that shown in Fig. 2, the auxiliary generator $A^4$ being so adjusted as to produce an electromotive force neutralizing the electromotive force of self-induction.

The invention is thus applicable to both single-phase and polyphase systems and is particularly useful in connection with polyphase systems, since such systems are at present more generally used for the purpose of transmitting power over great distances.

In order to make the auxiliary generator compensate for both resistance-drop and self-induction on the line, it is necessary to adjust the phase and strength of its electromotive force so as to be equal to and oppose the resultant of the electromotive force of self-induction and the electromotive force of resistance-drop. Thus supposing that in Fig. 4 $a\, b$ represent the electromotive force of self-induction and $b\, c$ the resistance-drop electromotive force, the line $b\, d'$ would represent the strength and phase of the electromotive force of the auxiliary generator necessary to overcome the forces $a\, b$ and $b\, c$, (the two components $b\, c'$ and $b\, a'$ neutralizing, respectively, the components of $b\, d$, $b\, c$, and $b\, a$.) Inasmuch as the electromotive force of the auxiliary generator and the resistance-drop electromotive force and the electromotive force of self-induction are all functions of the current flowing, it is evident that when the auxiliary generator is once adjusted so that $b\, d'$ is equal and opposite to the resultant of $a\, b$ and $b\, c$ for any one load it will continue to be equal and opposite to said resultant for all loads.

The foregoing explanation has been on the supposition that the power factor of the load remains constant, and when that is the case my invention provides a theoretically-perfect means of regulation; but in practice there will be some variation of the power factor corresponding to the load, and since the variation of the power factor would require resetting or readjustment of the field and armature section of the auxiliary generator in order to obtain perfect neutralization at all loads in practice the regulation will be entirely perfect only for one particular power factor; but if adjusted for the most important power factor it will be sufficiently approximate for the others to remove many of the difficulties now met with in power transmission.

Of course my invention is not limited to use with generators of the inductor type, but is applicable to systems employing alternating-current generators of any kind and admits of many changes in construction and arrangement of apparatus and circuits.

What I claim is—

1. In a system of distribution by alternating currents, a main alternating-current generator, an auxiliary alternating-current generator in series therewith, a transformer in series with said generators supplying an exciting-current to said auxiliary generator, and means for rectifying said exciting-current.

2. In a system of distribution by alternating currents, a main alternating-current generator, an auxiliary alternating-current generator in series therewith, and means for adjusting the relations of the field-magnet and armature of one of said alternating-current generators so as to vary the phase relations of said generators.

3. In a system of distribution by alternating currents, a main alternating-current generator, an auxiliary alternating-current generator in series therewith, a transformer in series with said generators supplying an exciting-current to said auxiliary generator, means for rectifying said exciting-current and means for adjusting the relations of the field-magnet and armature of one of said generators so as to vary the phase relations of said generators.

4. In a system of distribution by alternating currents, a main alternating-current generator, an auxiliary alternating-current generator in series therewith, a transformer in series with said generators supplying an exciting-current to said auxiliary generator, means for directing said exciting-current, and means for adjusting the relations of the field-magnet and armature of said auxiliary generator so as to vary the phase relations of said generators, and a shaft carrying the revolving parts of both generators and the current-directing device.

Signed at Pittsfield, Massachusetts, this 30th day of July, 1901.

JOHN F. KELLY.

Witnesses:
    HARRIET G. STAPLETON,
    RAYMOND TUCKER.